(12) United States Patent
Jakovljevic et al.

(10) Patent No.: US 10,001,971 B2
(45) Date of Patent: Jun. 19, 2018

(54) ELECTRONIC APPARATUS HAVING PARALLEL MEMORY BANKS

(71) Applicant: INTEL CORPORATION, Santa Clara, CA (US)

(72) Inventors: Radomir Jakovljevic, Belgrade (RS); Aleksandar Beric, Eindhoven (NL); Edwin Van Dalen, Eindhoven (NL); Dragan Milicev, Belgrade (RS)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/076,118

(22) Filed: Mar. 21, 2016

(65) Prior Publication Data

US 2016/0378650 A1 Dec. 29, 2016

Related U.S. Application Data

(62) Division of application No. 14/129,178, filed as application No. PCT/US2012/072149 on Dec. 28, 2012, now Pat. No. 9,329,834.

(60) Provisional application No. 61/585,176, filed on Jan. 10, 2012.

(51) Int. Cl.
*G06F 12/02* (2006.01)
*G06F 5/08* (2006.01)
*G06F 12/04* (2006.01)
*G06F 9/30* (2018.01)
*G06F 9/38* (2018.01)
*G06F 15/80* (2006.01)

(52) U.S. Cl.
CPC .............. *G06F 5/08* (2013.01); *G06F 9/3004* (2013.01); *G06F 9/30043* (2013.01); *G06F 9/3887* (2013.01); *G06F 12/0207* (2013.01); *G06F 12/04* (2013.01); *G06F 15/8007* (2013.01)

(58) Field of Classification Search
None
See application file for complete search history.

(56) References Cited

U.S. PATENT DOCUMENTS

| | | |
|---|---|---|
| 3,404,375 A | 10/1968 | Snyder |
| 4,992,933 A | 2/1991 | Taylor |
| 5,519,650 A | 5/1996 | Ichimura et al. |
| 5,555,359 A | 9/1996 | Choi et al. |
| 5,590,353 A | 12/1996 | Sakakibara et al. |

(Continued)

FOREIGN PATENT DOCUMENTS

| | | |
|---|---|---|
| EP | 1 016 970 A2 | 7/2000 |
| WO | WO 2010/095944 | 8/2010 |
| WO | WO 2013/106210 | 7/2013 |

OTHER PUBLICATIONS

International Search Report dated Apr. 22, 2013 for PCT/US2012/072149.

(Continued)

*Primary Examiner* — Mano Padmanabhan
*Assistant Examiner* — Jean C Edouard
(74) *Attorney, Agent, or Firm* — Schwabe, Williamson & Wyatt, P.C.

(57) ABSTRACT

An electronic apparatus may be provided that includes a processor to perform operations, and a memory subsystem including a plurality of parallel memory banks to store a two-dimensional (2D) array of data using a shifted scheme. Each memory bank may include at least two elements per bank word.

20 Claims, 9 Drawing Sheets

(56) References Cited

U.S. PATENT DOCUMENTS

| | | | |
|---|---|---|---|
| 5,752,068 A | 5/1998 | Gilbert | |
| 5,996,058 A | 11/1999 | Song et al. | |
| 6,003,129 A | 12/1999 | Song et al. | |
| 6,061,711 A | 5/2000 | Song et al. | |
| 6,397,324 B1* | 5/2002 | Barry | G06F 9/3004 711/149 |
| 6,665,768 B1* | 12/2003 | Redford | G06F 12/0607 365/230.03 |
| 6,728,862 B1 | 4/2004 | Wilson | |
| 6,941,446 B2 | 9/2005 | Stein et al. | |
| 7,233,612 B1* | 6/2007 | Zhang | H03M 13/27 375/130 |
| 7,694,078 B2 | 4/2010 | Setheraman et al. | |
| 7,941,634 B2 | 5/2011 | Georgi et al. | |
| 2002/0056022 A1 | 5/2002 | Leung | |
| 2002/0099910 A1 | 7/2002 | Shah | |
| 2003/0026135 A1 | 2/2003 | Hill et al. | |
| 2004/0064670 A1* | 4/2004 | Lancaster | G06F 9/30043 711/202 |
| 2007/0165547 A1 | 7/2007 | Lindwer et al. | |
| 2007/0165681 A1 | 7/2007 | Van Dalen et al. | |
| 2007/0258307 A1 | 11/2007 | Proell et al. | |
| 2008/0013388 A1 | 1/2008 | Asano et al. | |
| 2008/0140980 A1* | 6/2008 | Mei | G06F 13/1642 711/170 |
| 2008/0155491 A1 | 6/2008 | Van Dalen et al. | |
| 2008/0201689 A1* | 8/2008 | Lin | H03M 13/091 717/106 |
| 2008/0229063 A1* | 9/2008 | Kleihorst | G06F 15/8015 712/30 |
| 2008/0282038 A1* | 11/2008 | Sethuraman | H04N 19/433 711/134 |
| 2008/0294875 A1 | 11/2008 | Lyuh et al. | |
| 2009/0276606 A1* | 11/2009 | Mimar | G06F 15/8092 712/4 |
| 2009/0306800 A1 | 12/2009 | Van Dalen et al. | |
| 2010/0021062 A1* | 1/2010 | Kalevo | G06T 5/001 382/190 |
| 2010/0077176 A1* | 3/2010 | Pearlstein | G06F 7/785 712/22 |
| 2010/0088475 A1* | 4/2010 | Alba Pinto | G06F 12/0207 711/149 |
| 2010/0169576 A1* | 7/2010 | Chen | G06F 12/0897 711/122 |
| 2010/0199025 A1 | 8/2010 | Nanjou et al. | |
| 2011/0047348 A1 | 2/2011 | Kyo | |
| 2011/0134131 A1 | 6/2011 | Danilin et al. | |
| 2011/0225372 A1* | 9/2011 | Pirog | G06F 9/3851 711/141 |
| 2011/0225588 A1* | 9/2011 | Pollock | G06F 9/32 718/102 |
| 2012/0054464 A1* | 3/2012 | Minne | G06F 12/06 711/171 |
| 2012/0106287 A1 | 5/2012 | Catovic et al. | |
| 2012/0131288 A1 | 5/2012 | Box et al. | |
| 2012/0131309 A1* | 5/2012 | Johnson | G06F 9/30 712/41 |
| 2012/0210096 A1* | 8/2012 | Li | G06F 13/1663 711/209 |
| 2012/0242856 A1* | 9/2012 | Tay | H04N 5/23212 348/222.1 |
| 2013/0086360 A1* | 4/2013 | Zeng | G06F 9/30032 712/205 |
| 2013/0212353 A1* | 8/2013 | Mimar | G06F 9/345 712/4 |

OTHER PUBLICATIONS

U.S. Office Action for U.S. Appl. No. 14/129,178 dated Aug. 19, 2015.

Levinthal et al. "Chap-A SIMD Graphics Processor," ACM SIGGRAPH Computer Graphics, vol. 18, No. 3, Jul. 1984, pp. 77-82.

Lawrie et al. "Access and Alignment of Data in an Array Processor," IEEE Transactions on Computers, vol. C-24, Issue No. 12, Dec. 1975, pp. 1145-1155.

Duncan, Ralph, "A Survey of Parallel Computer Architectures," Journal of Parallel Architectures, vol. 23, Issue 2, 1990, 21 pages.

Finlayson et al. "Lookup-Table-Based Gradient Field Reconstruction," IEEE Transactions on Image Processing, Aug. 13, 2010 24 pages.

De Haan, Gerard, "Digital Video Post Processing," The Netherlands: University Press Eindhoven, 2010, 332 pages.

Gonzalez, Rafael C., "Digital Image Processing," $2^{nd}$ Edition, Prentice-Hall Inc., 2002, 190 pages.

Nguyen et al., "Exploiting SIMD Parallelism in DSP and Multimedia Algorithms Using the AltiVec Technology," Proceedings of the $13^{th}$ International Conference of Supercomputing, New York, USA: ACM, 1999, pp. 11-20.

Kuroda et al., "Multimedia processors," Proceedings of IEEE, Vo. 86, No. 6, Jun. 1998, pp. 1203-1221.

Puaut et al., "Scratchpad memories vs locked caches in hard real-time systems: a quantitative comparison," Automation Test in Europe Conference Exhibition, Apr. 2007, pp. 1-6.

Hennessy et al., "Computer Architecture: A Quantitative Approach," Fifth Edition, The Morgan Kaufmann Series in Computer Architecture and Design, Sep. 30, 2011, 848 pages.

McNeely et al., "Low power lookup tables for Huffman decoding," IEEE International Conference on Image Processing, vol. 6, Sep. 16, 2007-Oct. 19, 2007, 1 Page of Abstract only.

Lee et al., "New Lookup Tables and Searching Algorithms for Fast H.264/AVC CAVLC Decoding," IEEE Transactions on Circuits and Systems for Video Technology, vol. 20, No. 7, Jul. 19, 2010, 1 Page of Abstact Only.

Foley et al., "Computer Graphics: Principles and Practice;" $3^{rd}$ Edition, Addison-Wesley Longman Publishing Co., Inc. 2014, 184 pages.

Fatahalian et al., "A Closer Look at GPUs;" Communications of the ACM, vol. 51, No. 10, Oct. 2008, pp. 50-57.

Mese et al., "Look-Up Table (LUT) Method for Inverse Halftoning;" IEEE Transactions on Image Processing, May 22, 2002, 24 pages.

Budnik et al., "The Organization and Use of Parallel Memories;" IEEE Transactions on Computers, vol. C-20, Issue No. 12, Dec. 1971, 1 page of Abstract only.

International Preliminary Report on Patentability and Written Opinion received for PCT Patent Application PCT/US2012/72149, dated Jul. 24, 2014, 8 pages.

Banakar et al., "Scratchpad Memory; A Design Alternative for Cache On-chip Memory in Embedded Systems;" Proceedings of the Tenth International Symposium on Hardware/Software Codesign, 2002, pp. 73-78.

Richardson, Iain E., "H.264 and MPEG 4 video compression: Video Coding for Next-generation Multimedia;" Hoboken NJ, John Wiley & Sons Inc., 2003, 306 pages.

Molnar et al., "PixelFlow: High-Speed Rendering Using Image Composition;" SIGGRAPH Computer Graphics, vol. 26, Jul. 2, 1992, pp. 231-240.

Kahle et al., "Introduction to the Cell multiprocessor," IBM Journal of Research and Development, vol. 49, No. 4.5, Jul. 2005, pp. 589-604.

* cited by examiner

FIG. 3A
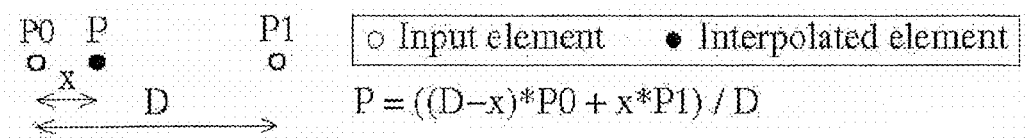
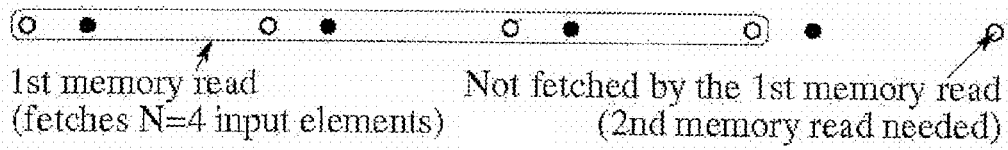
FIG. 3B

FIG. 4A
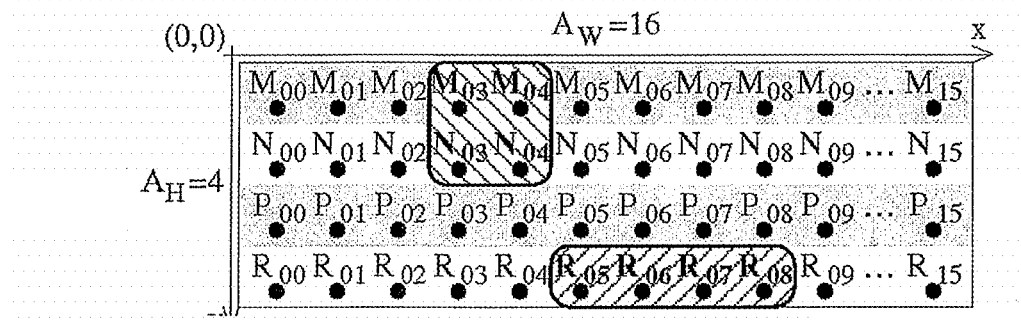
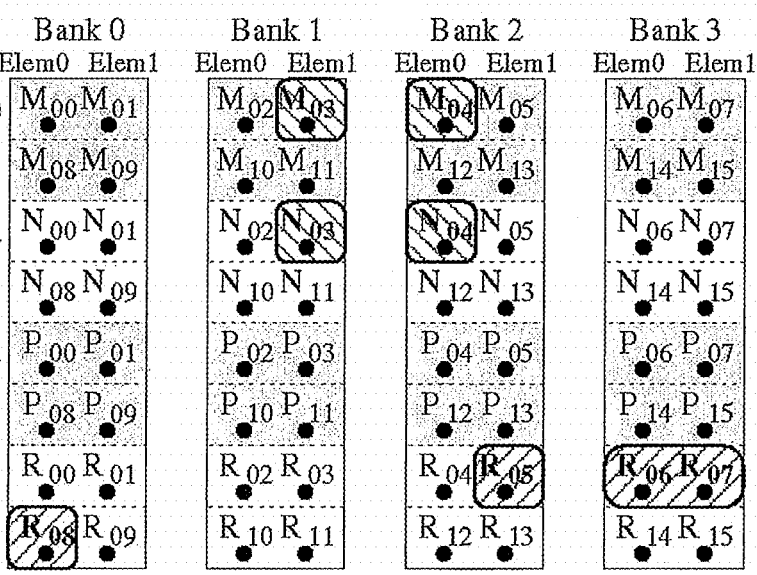
FIG. 4B

FIG. 8A
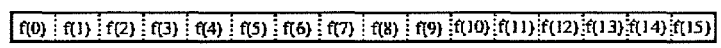
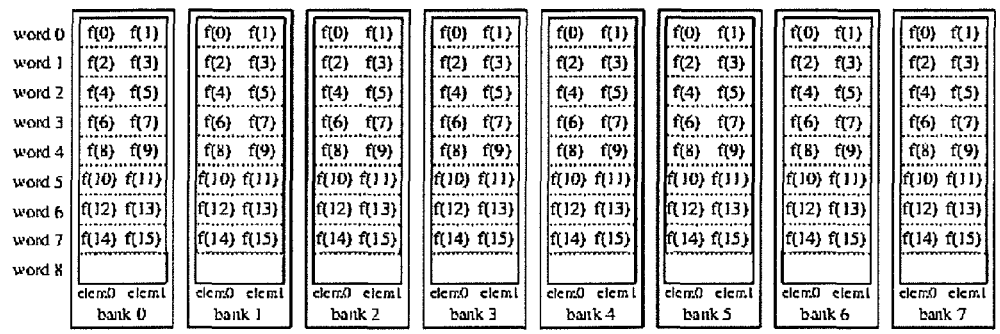
FIG. 8B
FIG. 9
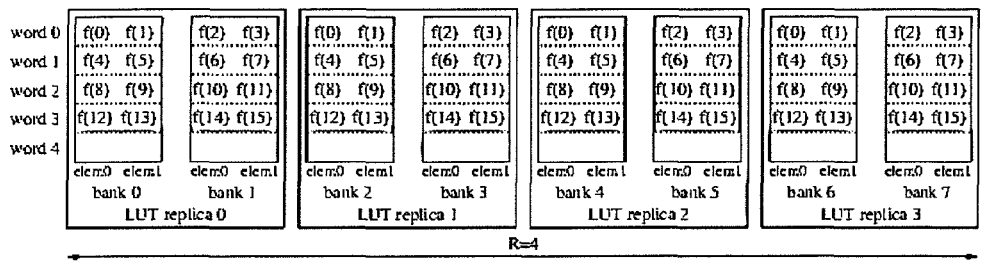

ELECTRONIC APPARATUS HAVING PARALLEL MEMORY BANKS

CROSS-REFERENCE TO RELATED APPLICATION

This application is a Divisional application of U.S. application Ser. No. 14/129,178, filed Dec. 24, 2015, which is a National Stage application of PCT/US2012/072149, filed Dec. 28, 2012, claims priority under 35 U.S.C. § 119(e) from U.S. Provisional Application No. 61/585,176, filed Jan. 10, 2012, the subject matter of which is incorporated herein by reference.

BACKGROUND

1. Field

Embodiments may relate to a single-instruction-multiple data (SIMD) processor and a corresponding memory (or memory subsystems).

BRIEF DESCRIPTION OF THE DRAWINGS

Arrangements and embodiments may be described in detail with reference to the following drawings in which like reference numerals refer to like elements and wherein:

FIG. 3A shows linear interpolation in a scalar way, and FIG. 3B shows linear interpolation in a SIMD way;

FIG. 4A shows a 2D array of memory, and FIG. 4B shows parallel memory banks.

FIG. 8A shows a look-up table data structure, and FIG. 8B shows a look-up table stored in 8 memory banks;

FIG. 9 shows four LUTs of 16 values stored in 4 groups of 2 memory banks per group.

DETAILED DESCRIPTION

Embodiments may relate to an electronic apparatus that includes a processor and a memory subsystem that includes a plurality of parallel memory banks.

Single-Instruction-Multiple-Data (SIMD) processors may be used to accelerate computationally intensive tasks, such as digital signal processing, multimedia and graphics, by exploiting data level parallelism. SIMD processors (and/or logic) may be throughput-oriented and may contain a set of SIMD functional units (datapath) capable of processing N data elements in parallel rather than one element, such as with scalar processors. To achieve a high throughput of SIMD processing, beside a properly dimensioned datapath, an efficient on-chip memory subsystem may be needed.

Figure 1:
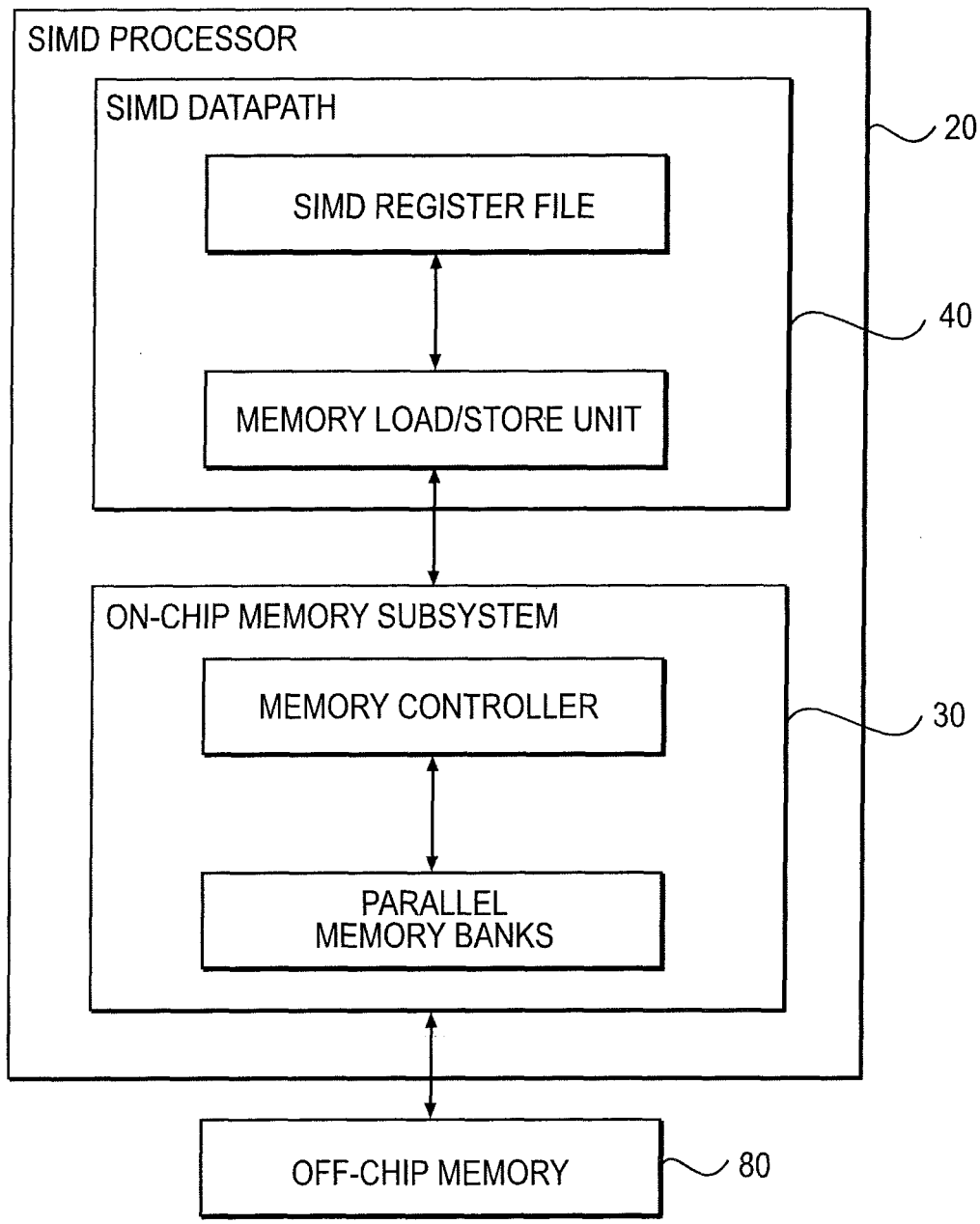
FIG. 1 shows a memory architecture according to an example arrangement.

FIG. 1 shows a memory architecture according to an example arrangement to enable high SIMD processing throughput. The memory architecture may include a processor 20 having an on-chip memory subsystem 30 and a datapath 40, such as a SIMD datapath. The processor 20 may be a SIMD processor. The datapath 40 may communicate with the memory subsystem 30 via a bus.

An off-chip memory 80 may be provided off chip. The memory 80 may be shared memory, namely memory that is shared with other elements of an electronic device. As one example, the memory 80 may be memory for a digital video recorder (DVR).

The processor 20, such as the SIMD processor, may process data elements in parallel. For video and/or images, each element may correspond to one pixel to be displayed. Accordingly, the processor 20 may process pixels in parallel.

The datapath 40 may include a SIMD register file and/or a memory load/store unit. The memory load/store unit may provide load and store instructions to load and store ID row or 2D block of elements from the 2D array in the on-chip memory subsystem 30.

The on-chip memory subsystem 30 may provide the concept of 2D array storage (e.g. size 1024×512 elements) by enabling access to 1D row and 2D block of (more than N, e.g. N=16) elements in parallel in the 2D array.

The on-chip memory subsystem 30 may have a number of parallel memory banks with a number of data elements per addressable word of a memory bank.

The on-chip memory subsystem 30 may include a memory controller to service requests from the corresponding memory load/store unit, and to control reads from the parallel memory banks and writes to the parallel memory banks.

In at least one embodiment, an electronic apparatus may include a processor to perform an operation, and a memory subsystem 30 including a plurality of memory banks to store a 2D array of data using a shifted scheme. The memory subsystem may be on-chip with the processor. As described hereinafter, the on-chip memory subsystem 30 may perform three primary features, namely to:

1) provide data to the datapath so as to keep the datapath (and bus) fully utilized. The provided data may be tailored to demands of target applications, and may minimize a number of memory accesses for SIMD implementations of processing tasks.

2) minimize a number of accesses to the off-chip memory 80 so as to limit interference with other concurrent contenders.

3) be efficient in silicon area and power dissipation terms.

The design of such a memory subsystem may be challenging, especially in view of versatility of applications' demands and need for ease of software development. Other arrangements may have addressed some of these requirements. The memory subsystems in other arrangements may range from general purpose to application-specific, with domain-specific memories in between the first two regarding application coverage. However, embodiments of the present invention may focus on memory subsystems for SIMD processors targeting video and image processing applications.

Embodiments may particularly relate to applications based on motion estimation and compensation and a broad class of finite impulse response (FIR) digital filters. One property of these applications may be a demand for storage of two-dimensional (2D) arrays of data elements and run-time defined accesses to groups of adjacent elements in 1D row, 1D column and 2D block shapes. For these desired shapes, two types of accesses may be demanded, aligned and unaligned. The aligned accesses may belong to a coarser grid (i.e., to a block of elements grid), whereas the unaligned accesses may be more flexible and belong to an element grid.

Figure 2:
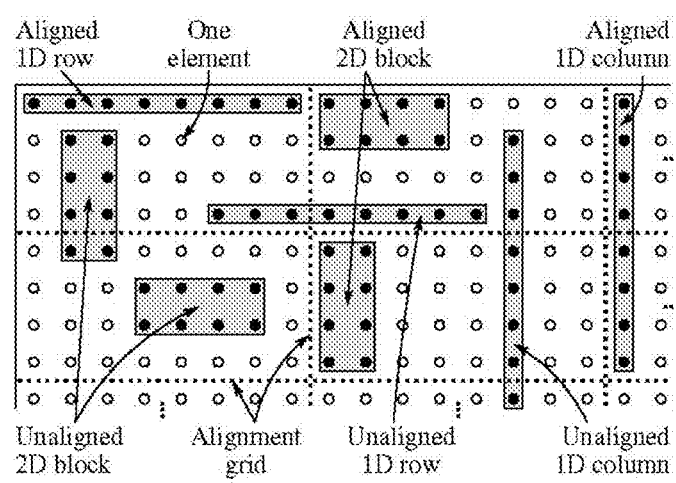
FIG. 2 shows a two-dimensional 2D array of memory according to an example arrangement.

FIG. 2 shows a two-dimensional (2D) array of memory according to an example arrangement. Other arrangement may also be provided.

More specifically, FIG. 2 shows differently demanded ways to access data in video and image processing applications (i.e., access modes). The applications may process 2D arrays of data elements and demand accesses to 1D rows, 1D columns and 2D blocks of elements in the 2D arrays.

If the accessed 1D or 2D shape belongs to a coarser grid (e.g. 8*4 elements) the access may be aligned, and unaligned if it belongs to the element grid. In this illustration, the number of elements per 1D and 2D access is 8 and the 2D blocks are 4*2 (4 elements wide and 2 lines high) and 2*4, whereas in general these values may depend on the application.

To answer such demands, parallel memory subsystems that enable accesses to N elements in parallel may be applied in the N-way SIMD processors. The architecture spectrum may include monolithic parallel memory subsystems. The monolithic parallel memory subsystems may be based on an efficient configuration of memory banks (i.e., the number of memory banks, number of addressable words per bank and width of an addressable word). Such a strictly efficiency-driven design may enable only one access mode, which may be the aligned access to a 1D row of N elements. Other demanded access modes may have to be emulated in software, requiring multiple sequentially performed memory accesses and data shuffles in the datapath. This may limit the processing throughput to only a portion of bandwidth at which the memory subsystem provides data. In a balanced architecture, the processing throughput should be equal to the data bandwidth of the memory subsystem.

Multiple memory subsystems may enable unaligned accesses to 1D rows, 1D columns and 2D blocks of different aspect ratios (dimensions) that have N elements in total. These memory subsystems may contain N memory banks with one element per addressable word of a bank. To ensure that all elements of an arbitrarily positioned 1D or 2D shape may be accessed in parallel, specific schemes of storing data in the memory banks (i.e. storage schemes) may be used. These memory subsystems may hereafter be referred to as N-bank memory subsystems. For a large N, the N-bank memory subsystems may require a large number of memory banks (e.g. 16 or 32). This may result in a larger silicon area cost as compared to the monolithic subsystems. The larger cost may be acceptable for applications that need such flexible access modes. However, the N-bank subsystems may not enable a possibility for a trade-off between cost and flexibility according to the target application demands.

A two-level on-chip memory subsystem may address needs of the video post-processing domain. A first memory level, closest to the processor (such as the processor 20), may be based on less than N memory banks with multiple elements per addressable word of a bank. This memory level may enable unaligned read and aligned write of 2D blocks of N elements. The second memory level may keep the bandwidth towards the off-chip memory (such as the off-chip memory 80) close to a theoretical minimum of one access per element. However, for the two-level approach, a high bandwidth may be spent for transferring data between the two on-chip memory levels. This may reduce the data bandwidth available to the datapath and hence limit the processing throughput. Additionally, there may be two copies of the same elements in the on-chip memories, resulting in a less efficient use of the valuable on-chip storage space.

One property of these memory subsystems is parallel access of up to N elements. On the other hand, video and image processing algorithms may commonly need a group of N and several more adjacent input elements to produce N output elements. Examples of such algorithms may be linear and bilinear interpolation and FIR filters. With the memory subsystems that enable parallel access to N elements, SIMD implementations of these algorithms may perform two memory accesses to produce one output of N elements, such as shown in FIG. 3. In such cases, the processing throughput may be limited to one half of the data bandwidth provided by the memory subsystem, even if the datapath supports a higher throughput. If the memory subsystem enabled parallel access to N and several more elements, then only one memory access may be performed per one output of N elements. Therefore, such a memory subsystem may enable up to two times higher processing throughput.

FIG. 3A shows linear interpolation in a scalar way. FIG. 3B shows linear interpolation in a SIMD way.

In FIG. 3A, two adjacent input elements (or pixels) P0 and P1 may be used to interpolate one output element P. In FIG. 3B, to interpolate N=4 elements in parallel, a SIMD datapath may need N+1=5 adjacent input elements from the memory. For memory subsystems that enable a parallel read of N elements, two reads may be performed per N output elements. In contrast, if the memory subsystem enables a parallel read of one more than N elements, only one read may need to be performed.

Embodiments may provide a one-level memory subsystem that addresses requirements of video and image applications without drawbacks of other arrangements. To enable parallel access to more than N elements in a cost-efficient way, the memory subsystem 30 may contain less than N memory banks with multiple elements per a bank word, as discussed below in Section I(B). Such a configuration of memory banks may be combined with a storage scheme (discussed below in Section I(A)) to enable unaligned read and write accesses to 1D rows and 2D blocks.

The dimensions of the 2D block access may be configurable at runtime, as will be discussed below in Section I(C). In Section II(A), for each configuration of 2D block dimensions, a description may be provided of a total number of elements that may be accessed in parallel, which may be called parallelism of the memory subsystem. The parallelism and flexibility in configuring dimensions of the 2D block access may be determined by design-time parameters of the memory subsystem 30. The same parameters may also determine configuration of memory banks, and thereby costs in terms of silicon area and power dissipation, as will be described below in Section II(B).

The memory subsystem according to example embodiments may enable trade-offs between parallelism and flexibility on one side and costs on the other side. Advantages of the memory subsystem according to example embodiments may be provided in Section II(C) in comparison with the N-bank and two-level subsystems through a case study of motion estimation.

Section I: Discussion of Memory Subsystem Architecture

A memory subsystem architecture according to an example embodiment may enable storage of 2D arrays of data elements and unaligned accesses to 1D rows and 2D blocks in the 2D arrays. To enable such access modes, the memory subsystem may contain multiple memory banks and may use a specific storage scheme.

A number of memory banks may be denoted as B, a number of addressable words per bank may be denoted as W, and a number of elements per addressable word of a bank may be denoted as E. The values of bank B, word W and element E may be determined at design-time based on input parameters of the memory subsystem, as will be described below in Section I(B).

In addition to a memory bank configuration, a specific storage scheme may be provided to ensure that all elements of a 1D row or a 2D block at an arbitrary position in the 2D array may be accessed in parallel. With the storage scheme, a set of rules (equations) may be provided that determine a unique location of each array element in the memory banks. The storage scheme, an analysis of its parallelism and equations may be provided in Section I(A).

Embodiments may provide a one-level memory with less than N parallel banks and multiple elements per addressable word of a bank (see equations 7-9 below), which in combination with a shifted storage scheme (see equation 4 below) may enable parallel access of more than N elements in 1D row and 2D block shapes to speed up SIMD video and image processing.

Embodiments may be provided where more than N elements may be loaded from the memory subsystem and passed to the SIMD processor with: (a) mostly standard SIMD instructions (that operate N elements in parallel); and (b) one or more specific SIMD instructions that has input of more than N elements and output of N elements (e.g. linear interpolation) to speed up SIMD video and image processing.

Embodiments may also use (or reuse) the parallel memory banks to enable lookup access with tradeoff between lookup speed and storage overhead.

Section I(A): Storage Scheme

Before describing the storage scheme according to an example embodiment of the memory subsystem, a simpler storage scheme according to an example arrangement may be described for a 2D array of $A_H$ lines and $A_W$ elements per line, as shown in FIG. 4(a). With the storage scheme according to the example arrangement, each line of the 2D array may be stored in the memory banks in a row-wise way beginning from the bank with index 0, as shown in FIG. 4B.

FIG. 4A shows a 2D array of memory, and FIG. 4B shows parallel memory banks.

FIGS. 4A-4B show the scheme of storing a 2D array in parallel memory banks. Each array line is stored row-wise beginning from memory bank 0. The elements of each column of the array (e.g. M03, N03, P03 and R03), may be stored in different words of the same memory bank and can not be accessed in parallel assuming standard single-port banks. This scheme therefore does not enable 2D block accesses (e.g. M03, M04, N03 and N04), but only 1D row accesses (e.g. R05, R06, R07 and R08).

As an example, assume access to an element at a location (x, y) in the 2D array of FIG. 4A, counted from a top-left array location (0, 0). To access the element, its location in the memory banks of FIG. 4B may have to be determined. The location in the memory banks may be determined based on three values, namely: (1) a bank index (Bank); (2) an addressable word in that bank (Word); and (3) an element position in the word (Elem). For the storage scheme according to an example arrangement, the following equations may determine these three values:

$$\text{bank} = \left\lfloor \frac{x}{E} \right\rfloor \bmod B \quad (1)$$

$$\text{word} = y * \left\lceil \frac{A_W}{B*E} \right\rceil + \left\lfloor \frac{x}{B*E} \right\rfloor$$

$$\text{elem} = x \bmod E.$$

The location (x, y) of an element in the 2D array (FIG. 4A) may also be expressed with a single value a, as a row-wise offset from the location (0, 0) to (x, y). In that example, $a=y*A_W+x$, $y=\lfloor a/A_W \rfloor$ and $x=a \bmod A_W$. Considering that, the bank, word and elem equations may become:

$$\text{bank} = \left\lfloor \frac{a \bmod A_W}{E} \right\rfloor \bmod B \quad (2)$$

$$\text{word} = \left\lfloor \frac{a}{A_W} \right\rfloor * \left\lceil \frac{A_W}{B*E} \right\rceil + \left\lfloor \frac{a \bmod A_W}{B*E} \right\rfloor$$

$$\text{elem} = (a \bmod A_W) \bmod E.$$

An analysis may now relate to how many elements (or pixels) may be accessed in parallel with the storage scheme and in what shapes of elements may be accessed. With this scheme according to an example arrangement, all elements of a column of the 2D array may be located in different words of a same memory bank (e.g. M03, N03, P03 and R03 in FIG. 4A). Assuming that one word of a bank may be accessed at a time (i.e., single port banks), then only one element of a 2D array column may be accessed at a time. Therefore, the storage scheme according to the example arrangement may enable parallel access to only horizontally adjacent 2D array elements. In other words, the storage scheme according to the example arrangement may enable a 1D row access mode.

The number of elements that may be accessed in parallel may depend on access alignment (i.e., on a location of the most left element of the 1D row in the 2D array ($a_{row}$)). If $a_{row}$ is a multiple of E, then the access may be aligned to the memory bank grid. In that example, 1D row of B*E elements may be accessed. That is, a maximum number of elements may be accessible in parallel with this storage scheme and configuration of memory banks. However, parallelism of the scheme may be lower when the access is unaligned (i.e., when $a_{row}$ is not a multiple of E). The number of elements that may be accessed in parallel may be minimal when $a_{row}=k*E-1$, $k=\{1, 2, 3 \ldots \}$. In these examples, the most left element of the accessed 1D row may be at the most right position in the memory bank word (e.g. M11 when $a_{row}=11$ in FIG. 4). In that bank, only one element may be accessed. At each of the remaining B-1 banks, E elements may be accessed in parallel. Therefore, the minimal number of horizontally adjacent elements of the 2D array that may be accessed in parallel is 1+(B-1)*E. This number of elements may be the guaranteed parallelism of the storage scheme according to the example arrangement, regardless of the 1D row access alignment.

To enable parallel access to a 2D block, the data has to be stored such that there are no two elements of the 2D block located in different words of a same memory bank. Embodiments of the memory subsystem may achieve this by using a shifted storage scheme as shown in FIG. 5.

Figure 5:
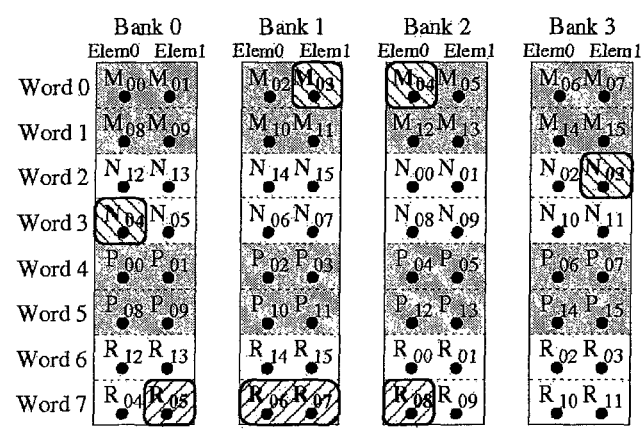
FIG. 5 shows shifted scheme of storing a 2D array in parallel memory banks according to an example embodiment.

FIG. 5 shows a shifted scheme of storing a 2D array in parallel memory banks according to an example embodiment. Other embodiments and configurations may also be provided.

With the shifted storage scheme, lines of the 2D array (FIG. 4A) may be stored row-wise in the memory banks (of FIG. 5), same as with the scheme of the arrangement discussed above with respect to FIG. 4B. In contrast to the arrangement discussed above with respect to FIG. 4B, adjacent lines of the 2D array (FIG. 4A) may be mutually shifted in the memory banks. More precisely, the n-th line of the 2D array may be stored beginning from the bank (n*S) mod B, where B is the number of banks, and S is a shift factor in terms of banks, and n $\in[0, A_H-1]$.

FIG. 5 shows B=4, S=2 and AH=4. Thereby every group of two adjacent array lines may be mutually shifted, and the scheme may enable accesses to 2D blocks of two lines in parallel. Additionally, the scheme may enable accesses to 1D rows in the same 2D array.

Assuming that the shift factor S divides the bank B, B/S adjacent lines of the 2D array may be mutually shifted in the memory banks. This may mean that 1D columns of B/S adjacent elements of the 2D array may be accessed in parallel. Since the shift between two adjacent array lines is S memory banks, parallel access to 1+(S−1)*E such 1D columns may be guaranteed regardless of the 2D block access alignment. In summary, the shifted storage scheme may enable access to an arbitrarily positioned 2D block of up to $Blk_H$ lines with up to $Blk_W$ elements per line, as defined by the following equations:

$$Blk_H = \frac{B}{S} \quad (3)$$
$$Blk_W = 1 + (S-1)*E.$$

In addition to accesses to such 2D blocks, the shifted scheme according to example embodiments may enable accesses to arbitrarily positioned 1D rows of up to 1+(B−1)*E elements in a same 2D array. That is because the elements of a 2D array line may be stored row-wise in the memory banks in the same way as with the above described scheme (FIG. 4(b)) according to an example arrangement. The possibility of both 1D row and 2D block accesses may be important since the 2D array elements may be transferred from the off-chip memory (such as the off-chip memory 80) as 1D rows, whereas the SIMD datapath may demand 2D block accesses.

The bank, word and elem equations that represent the shifted storage scheme may be defined by extending equation 2 with the shift factor S and the 2D block height $Blk_H$:

$$bank = \left(\left\lfloor\frac{a \bmod A_W}{E}\right\rfloor + \left(\left\lfloor\frac{a}{A_W}\right\rfloor \bmod Blk_H\right)*S\right) \bmod B \quad (4)$$

$$word = \left\lfloor\frac{a}{A_W}\right\rfloor * \left\lceil\frac{A_W}{B*E}\right\rceil +$$

$$\left\lfloor\frac{\left\lfloor\frac{a \bmod A_W}{E}\right\rfloor + \left(\left\lfloor\frac{a}{A_W}\right\rfloor \bmod Blk_H\right)*S}{B}\right\rfloor \bmod \left\lfloor\frac{A_W}{B*E}\right\rfloor$$

$$elem = (a \bmod A_W) \bmod E.$$

Section I(B): Configuration of Parallel Memory Banks

The following may relate to a configuration of parallel memory banks. This may correspond to the on-chip memory subsystem 30 provided on chip.

As will be discussed, the parallel memory banks may include less than N memory banks and enable read/write of 2D blocks of data of N elements. The parallel memory banks may be considered a single level of memory, that has less than N memory banks, and access to more than N elements (in parallel). The processor may have access to more elements with less memory banks.

The equation 3 (discussed above) may related to (or define) parallelism of the shifted storage scheme. These equations may be analyzed to determine the value of the shift factor S, and the required memory banks configuration, namely bank B, element E and word W. These values may be determined for the given 2D block height $Blk_H$ in terms of lines and block width $Blk_W$ in terms of elements. Both the block height $Blk_H$ and the block height $Blk_W$ may be design-time parameters of the memory subsystem, such as the memory subsystem 30 shown in FIG. 1.

Assuming that the values of the bank B and the element E are fixed at design-time, by setting the value of the shift factor S, the storage scheme may be adjusted for different dimensions of 2D block accesses. The value of the shift factor S may also be fixed at design-time to enable simpler and faster hardware implementation of internal addressing logic defined by equation 4. One drawback may be a lack of flexibility to choose the 2D block dimensions at run-time. Another option may be to enable setting S at run-time to provide more flexibility of 2D block accesses.

This may result in a more complex and slower hardware implementation of the equations 4. One may enable setting the value of the shift factor S at run-time, but to limit it to powers of two. Accordingly, the run-time flexibility of 2D block accesses may be provided to a certain extent, as discussed in Section I(C), and complexity of hardware implementation may be kept moderate.

To further reduce complexity of hardware implementation, the values of B, E and $A_W$ may be limited to powers of two. With these assumptions, all multiplication, division and modulo operations in the equations 4 may be implemented using only left shift, right shift and logical conjunction, respectively. Following the previous assumptions and considering the first equation in 3, the parameter block height $Blk_H$ may need to be a power of two.

The third design-time parameter may be the number of elements processed in parallel by the target SIMD processor, denoted as N. The number of elements N may be assumed to be a power of two, which is the case for most of the SIMD processors.

Embodiments may enable parallel access to more than N elements when required by target applications. Two examples of the parameter block width $Blk_W$ may be provided. In the first example, parallel access to more than N elements may be required. One additional column may be required per access to a 2D block with block height $Blk_H$ lines (i.e. $Blk_W = N/Blk_H + 1$). In the second example, a parallel access to N elements may be required and therefore $Blk_W = N/Blk_H$. Considering these two examples and the second equation in 3, the following expressions may need to be true to guarantee a parallel access to a 2D block of $Blk_H$ lines with $Blk_W$ elements per line:

$$1 + (S-1)*E \geq \frac{N}{Blk_H} + 1, Blk_W = \frac{N}{Blk_H} + 1 \quad (5)$$

$$1 + (S-1)*E \geq \frac{N}{Blk_H}, Blk_W = \frac{N}{Blk_H}.$$

Another concern of the design of the memory subsystem may be silicon area cost. Embodiments may use as few as possible memory banks. Following that and the first equation in 3, the shift factor S should be minimal for the given block height $Blk_H$. The minimal values of the shift factor S such that the equations 5 have solutions $$S_{min} = \begin{cases} 2, Blk_W = \frac{N}{Blk_H} + 1 & \vee Blk_H < N \\ 1, Blk_W = \frac{N}{Blk_H} & \wedge Blk_H = N. \end{cases} \quad (6)$$

Replacing the shift factor S with $S_{min}$ in the first equation in 3 may provide the equations for the minimal required number of memory banks:

$$B = \begin{cases} 2*Blk_H, Blk_W = \frac{N}{Blk_H} + 1 & \vee Blk_H < N \\ Blk_H, Blk_W = \frac{N}{Blk_H} & \wedge Blk_H = N. \end{cases} \quad (7)$$

Considering the shift factor values provided by equation 6, the minimal power of two value of E may be provided such that the equations 5 are true.

$$E = \frac{N}{Blk_H}. \quad (8)$$

To determine the number of addressable words of a memory bank W, the total capacity of the memory subsystem in terms of words of N elements may be assumed to be the fourth design-time parameter denoted with C. Assuming that C is even, the equations that determine W are:

$$W = \frac{C*N}{B*E} = \begin{cases} \frac{C}{2}, Blk_W = \frac{N}{Blk_H} + 1 & \vee Blk_H < N \\ C, Blk_W = \frac{N}{Blk_H} & \wedge Blk_H = N. \end{cases} \quad (9)$$

From the equations 6-9, the memory bank configuration of the N-bank memory subsystems may be equal to the configuration of the memory subsystem in the example of $Blk_H=N$ and $Blk_W=N/Blk_H$. The N-bank configuration may be considered as a special case of the memory banks configuration.

Section I(C): Run-Time Dimensions of 2D Block Access

This section may analyze flexibility in choosing dimensions of 2D block access at run-time, provided by the memory banks configuration and shifted storage scheme according to example embodiments. Other embodiments and configurations may also be provided.

It is assumed that a memory banks configuration may be determined at design-time according to equations 7-9. For the given memory banks configuration and according to equations 3, dimensions of 2D block access may be chosen at run-time by setting the value of the storage scheme shift factor S.

The equations 6 may define the minimal value of the shift factor needed to enable parallel access to an arbitrarily positioned 2D block of $Blk_H$ lines with $Blk_W$ elements per line. Increasing the value of the shift factor S may decrease the number of lines of a 2D block that may be accessed in parallel, but may increase the 2D block width as defined by the equations 3. The design-time parameter block height $Blk_H$ may therefore represent the maximal number of lines of a 2D block that may be accessed in parallel. The number of lines of a 2D block that may be accessed in parallel may be minimal, and the 2D block width may be maximum in case of the maximal value of the shift factor S. The maximal value of the shift factor S is B memory banks, when the shifted storage scheme becomes equal to the scheme discussed above according to the example arrangement. The shift factor S may be set to any power of two between the minimal and maximal values. All values of the shift factor for the given configuration of memory banks are:

$$S_i = S_{min} * 2^i, \; i \in [0, \log_2(Blk_H)]. \quad (10)$$

Each value of the shift factor Si may enable unaligned access to a 2D block of up to $Blk_{Hi}$ lines and up to $Blk_{Wi}$ elements per line, the values of $Blk_{Hi}$ and $Blk_{Wi}$ may be obtained by replacing the shift factor S with $S_i$ in the equations 3:

$$Blk_{Hi} = \frac{B}{S_i} = \frac{B}{S_{min}*2^i} = \frac{Blk_H}{2^i} \quad (11)$$

$$Blk_{Wi} = 1 + (S_i - 1)*E = 1 + (S_{min}*2^i - 1)*\frac{N}{Blk_H}.$$

According to the set of values of I given by the equation 10, the number of 2D block dimensions supported with one memory banks configuration may be proportional to $Blk_H$. Therefore, the parameter $Blk_H$ may determine the run-time flexibility in choosing the 2D block access dimensions.

Section II: Results

A. Parallelism Analysis

The parallelism $P_i$ may be analyzed of the presented memory subsystem, defined as the number of elements that may be accessed in parallel. In an example of a 2D block access of $Blk_{Hi}$ lines and $Blk_{Wi}$ elements per line, the parallelism is $P_i=Blk_{Hi}*Blk_{Wi}$ elements. Considering that and the equations 11 and 6, the following equation may be derived:

$$P_i = \begin{cases} \frac{N*(2^{i+1}-1)+Blk_H}{2^i}, Blk_W = \frac{N}{Blk_H} + 1 & \vee \\ & Blk_H < N \\ N, Blk_W = \frac{N}{Blk_H} & \wedge Blk_H = N. \end{cases} \quad (12)$$

$P_i$ may now be compared with the parallelism of the memory subsystems that enable parallel access to N elements. The parallelism advantage of the presented memory subsystem may be calculated as the number of elements that may be accessed in parallel in addition to N: $M_i=P_i-N$. By replacing $P_i$ with the right side of the equation 12, the following result may be obtained:

$$M_i = \begin{cases} \dfrac{N*(2^i-1)+Blk_H}{2^i}, & Blk_W = \dfrac{N}{Blk_H}+1 \bigvee Blk_H < N \\ 0, & Blk_W = \dfrac{N}{Blk_H} \bigwedge Blk_H = N. \end{cases} \quad (13)$$

In the examples of $Blk_W=N/Blk_H+1$ or $Blk_H<N$, $M_i$ is greater than zero and monotonically increases as i increases from 0 to log $2(Blk_H)$. The minimum of $M_i$ is $Blk_H$ for i=0 (i.e., for a 2D block access of $Blk_H$ lines and $N/Blk_H+1$ elements per line). The maximum of $M_i$ is $(N/Blk_H)*(Blk_H-1)+1$ for i=log $2(Blk_H)$ (i.e., for a 2D block access of one line). The guaranteed parallelism of the presented memory subsystem may therefore $N+Blk_H$ elements, regardless of the 2D block access dimensions.

In the example of $Blk_W=N/Blk_H$ and $Blk_H=N$, the presented memory subsystem may be equal to the N-bank subsystems, as discussed in Section I(B). In that example, there is no parallelism advantage of the presented memory subsystem.

Table I illustrates $P_i$ and $M_i$ defined by equations 12 and 13, respectively, for values of the design-time parameters N and $Blk_H$, and for $Blk_W=N/Blk_H+1$.

Considering the equations 12 and 13, as well as Table I, for a given N, the parallelism of the presented memory subsystem may be proportional to $Blk_H$

TABLE 1

PARALLELISM OF THE PRESENTED MEMORY SUBSYSTEM, GIVEN FOR VALUES OF THE DESIGN-TIME PARAMETERS N AND $Blk_H$. N DENOTES THE NUMBER OF ELEMENTS PROCESSED IN PARALLEL BY THE TARGET SIMD PROCESSOR. $Blk_H$ DENOTES THE MAXIMAL NUMBER OF LINES ACCESSIBLE IN THE MEMORY SUBSYSTEM IN CASE OF 2D BLOCK ACCESS MODE. AS THE TOTAL NUMBER OF ELEMENTS THAT CAN BE ACCESSED IN PARALLEL ($P_i$) DEPENDS ON THE RUN-TIME DIMENSIONS OF 2D BLOCK ACCESS, THE MINIMUM AND MAXIMUM OF $P_i$ ARE GIVEN FOR EACH PAIR OF N AND $Blk_H$. THE PARALLELISM ADVANTAGE OF THE PRESENTED OVER OTHER SUBSYSTEMS THAT ENABLE PARALLEL ACCESS TO N ELEMENTS IS $M_i = P_i - N$. $M_i$ IS GIVEN BOTH IN TERMS OF ELEMENTS AND PERCENTAGE (Mi = N * 100). WE CAN NOTICE THAT $P_i$ AND $M_i$ INCREASE AS $Blk_H$ INCREASES, FOR EACH GIVEN N.

| N elements | $Blk_H$ lines | $P_i$ elements | $M_i$ elements | % |
|---|---|---|---|---|
| 16 | 2 | 18-25 | 2-9 | 13-56 |
| 16 | 4 | 20-29 | 4-13 | 25-81 |
| 16 | 8 | 24-31 | 8-15 | 50-94 |
| 32 | 2 | 34-49 | 2-17 | 6-53 |
| 32 | 4 | 36-57 | 4-25 | 13-78 |
| 32 | 8 | 40-61 | 8-29 | 25-91 |

B. Silicon Area and Power Dissipation Costs

Silicon area and power dissipation costs of the presented memory subsystem may now be analyzed. The costs of a memory subsystem may include the memory banks costs and costs of the subsystem's internal logic that may control the banks and implement specific access modes. The banks costs may be dominant over the logic costs, which may be confirmed in Section II(C). Therefore, only the memory banks costs may be discussed.

For a given configuration of memory banks, the total silicon area may be a simple sum of areas of B memory banks. The silicon area cost may therefore be determined at design-time, along with the configuration of memory banks.

The total power dissipation may depend on a frequency of performing memory accesses at run-time, as well as on the number of banks that are active while performing an access. In this section, it is assumed that one million memory accesses per second (i.e., the access frequency of one megahertz (MHz)). It may be assumed that the maximal number of elements per access is defined by equation 12, which requires activating all memory banks. Following these assumptions, the total power dissipation may be the sum of dissipations of B individual banks, and may represent the maximal dissipation of a given memory banks configuration. In Section II(B)1, power dissipation may be analyzed in examples when the number of elements per memory access is lower than the maximum.

Figure 6:
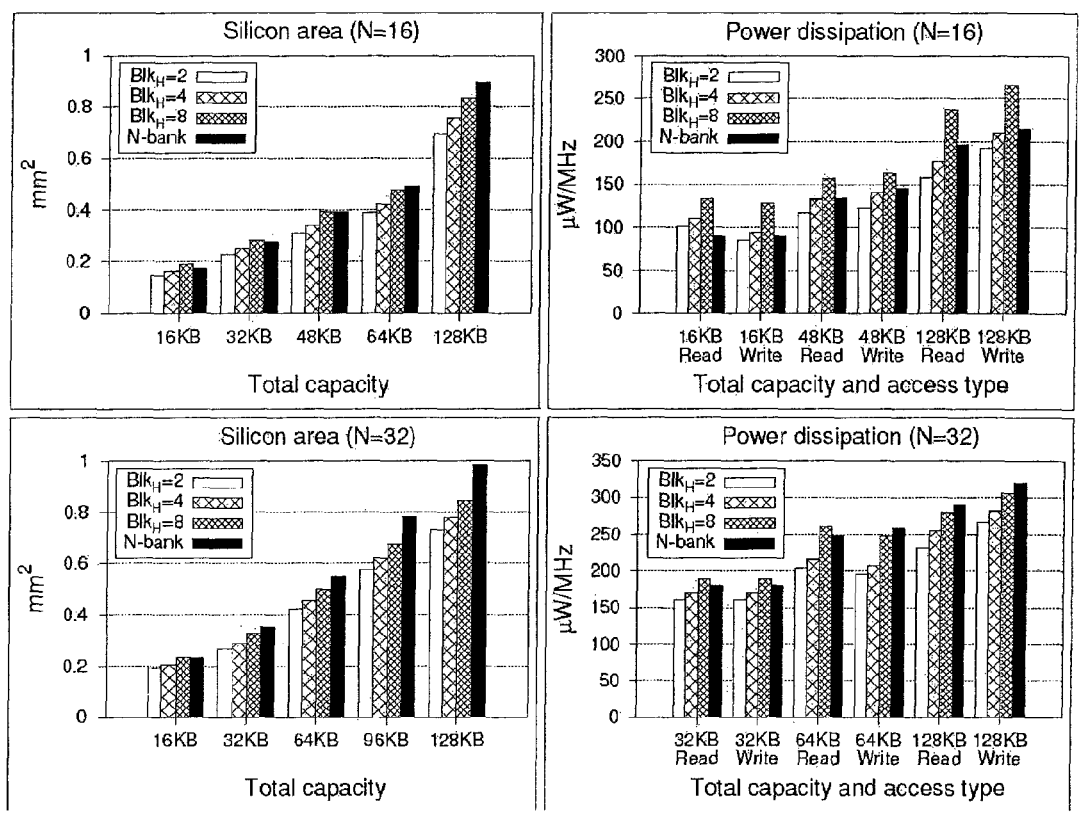
FIG. 6 are graphs showing silicon area and maximal power dissipation costs of memory banks configurations of the presented memory subsystem.

FIG. 6 are graphs showing silicon area and maximal power dissipation costs. Other graphs and configurations may also be provided. FIG. 6 illustrates the silicon area and power dissipation costs for values of N and $Blk_H$, for $Blk_W=N/Blk_H+1$, and multiple representative cases of total subsystem capacity. The costs in a low power 65 nm CMOS technology may be provided for values of the design-time parameters N and $Blk_H$, as well as for multiple values of total capacity of the memory subsystem in terms of kilobytes (KB). N may denote the number of elements processed in parallel by the target SIMD processor. $Blk_H$ may denote the maximal number of lines accessible in the memory subsystem in case of 2D block access mode. The data element may be 8 bits wide. The charts may indicate that silicon area and power dissipation may moderately increase as $Blk_H$ doubles, which is the case for all shown combinations of N and the total capacity. For comparison, the charts may show the costs of the N-bank configurations that contain N memory banks with one 8 bit element per addressable word and the same total capacity as the corresponding presented configuration.

Additionally, a data element may be assumed to be 8 bits wide, which may be needed to determine width of the banks in terms of bits (8*E). The illustrated costs may be based on single port SRAM (Static Random Access Memory) banks in a low power 65 nm CMOS technology.

FIG. 6 shows that the silicon area and power dissipation costs of the presented memory subsystem may increase as the $Blk_H$ increases. The flexibility in choosing 2D block dimensions at run-time and the parallelism of the memory subsystem are also proportional to $Blk_H$, as discussed in Sections II(C) and III(A), respectively. The presented memory subsystem may enable trade-offs between the flexibility and parallelism on one side and the costs on the other side.

FIG. 6 also shows costs of the N-bank configuration of memory banks for the same values of N, total capacity and data element width. If we compare the costs of the presented memory subsystem to the N-bank costs, we can observe the following.

The silicon area of the presented memory subsystem may be lower in almost all illustrated examples. In these examples, the silicon area advantage of the presented memory subsystem may be up to 25%. The exceptions may be the examples when the value of $Blk_H$ is high (8), the total capacity is small (16 KB and 32 KB) and N=16. In these two examples, the silicon area overhead of the presented memory subsystem may be 3-8%. However, as Table I indicates, such silicon area overhead may be justified by 50-94% higher access parallelism.

The power dissipation of the presented memory subsystem may be lower in most examples. The exceptions are the examples when $Blk_H$ is high (8) or the total capacity is 16

KB. In these examples, the power dissipation of the presented memory subsystem may be higher by 5-25%, whereas the parallelism may be higher by 25-94%.

To conclude, compared to the N-bank subsystems, the presented memory subsystem may offer advantages in both parallelism and costs. In the great majority of other examples, the silicon area and power dissipation overheads may be justified by at least two times higher advantage in the parallelism. In the worst case for the presented memory subsystem (i.e., N=16 and the total capacity of 16 KB), the parallelism advantage may be equal to the power dissipation overhead.

1) Power Dissipation Analysis:

Earlier in Section II(B), the maximal power dissipation of the presented memory subsystem was analyzed, assuming the maximal number of elements per 2D block access, as defined by equation 12. The maximal number of elements per access may be greater than N with configurations of the memory subsystem such that $Blk_W=N/Blk_H+1$ or $Blk_H<N$.

In addition to the 2D block access modes of more than N elements, the same memory subsystem configurations may provide access modes of N elements. These access modes may be provided to increase run-time flexibility of the memory subsystem, and support a wider range of applications.

The 2D block access modes of N elements may be defined to access the same number of lines as defined by equation 11. Following that the number of elements per line may be lower such that the number of elements per 2D block is N:

$$Blk_{Hi}^N = Blk_{Hi} = \frac{Blk_H}{2^i} \quad (14)$$

$$Blk_{Wi}^N = \frac{N}{Blk_{Hi}^N} = 2^i * \frac{N}{Blk_H}.$$

In this section, power dissipation may be analyzed when the 2D block accesses of N elements are performed. In the analysis, a memory bank may be assumed to dissipate power only when it is active. In other words, power dissipation of a memory bank may be neglected when the bank is not active and its input pins are held stable. This assumption may be true with the low power 65 nm CMOS technology. The power dissipation of a 2D block access may therefore be proportional to the number of memory banks that are activated to access all elements of the 2D block.

In case a 2D block access is aligned to the bank grid (i.e., the 2D block address is a multiple of E elements), the number of activated memory banks may be $(Blk_{Wi}^N/E)*Blk_{Hi}^N$. Otherwise, in case of an unaligned 2D block access, one additional memory bank may be activated per line of the 2D block. The total number of activated memory banks in this example is therefore $(Blk_{Wi}^N/E)+1)*Blk_{Hi}^N$.

If we assume a large number of 2D block accesses at runtime defined (pseudo-random) addresses, in average there may be 1/E*100% bank aligned and (E-1)/E*100% unaligned accesses. The average number of activated banks for a 2D block access of $Blk_{Hi}^N$ lines and $Blk_{Wi}^N$ elements per line is:

$$B_i^a = \frac{1}{E} * \frac{Blk_{Wi}^N}{E} * Blk_{Hi}^N + \frac{E-1}{E} * \left(\frac{Blk_{Wi}^N}{E}+1\right) * Blk_{Hi}^N \quad (15)$$

$$= Blk_H + \left(1 - \frac{Blk_H}{N}\right) * Blk_{Hi}^N.$$

Figure 7:
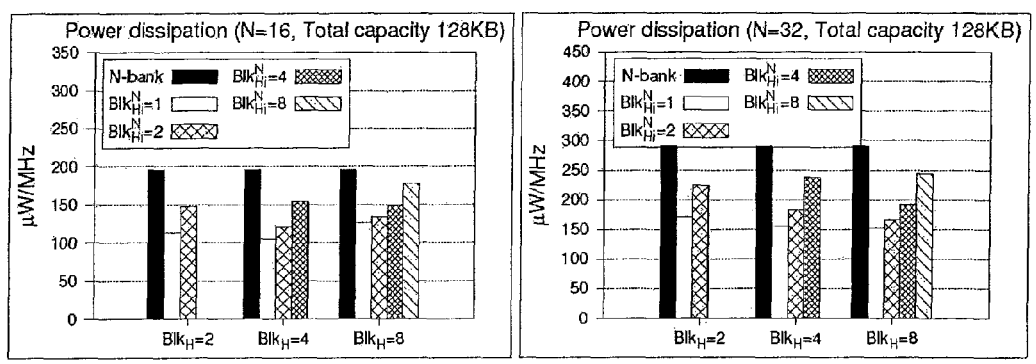
FIG. 7 illustrates trade offs for values of N and $Blk_H$.

By multiplying $B_i^a$ with the power dissipation of a single memory bank, we may obtain the average power dissipation per 2D block access of N elements. Following that and analyzing equation 15, we may conclude the following. In examples of the N-bank configuration of memory banks ($Blk_H=N$), the average power dissipation may be determined at design-time by the parameter N, and may be constant regardless of the runtime choice of 2D block access dimensions. In examples when $Blk_H<N$, the average power dissipation may be determined by the design-time parameters $Blk_H$ and N, as well as by the run-time chosen number of lines $Blk_{Hi}^N$ of the accessed 2D block. In other words, besides the design-time trade-off, there may be a run-time trade-off between the number of lines of a 2D block access of N elements and the average power dissipation. FIG. 7 illustrates these trade-offs for values of N and $Blk_H$, and all values of $Blk_{Hi}^N$ defined by equation 14.

Average power dissipation in case of 2D block accesses of N elements and the presented configurations of memory banks that enable parallel access to more than N elements. The power dissipation values in a low power 65 nm CMOS technology may be provided for multiple memory banks configurations, determined by values of the design-time parameters N and $Blk_H$. For each design-time configuration, the power dissipation may be provided for all dimensions of 2D block access that may be chosen at run-time. N may denote the number of elements processed in parallel by the target SIMD processor. $Blk_H$ may denote the maximal number of lines accessible in the memory subsystem in an example of 2D block access mode. $Blk_{Hi}^N$ may denote the run-time chosen number of lines of a 2D block C. Motion Estimation Case Study This section may provide a case study of motion estimation to illustrate advantages of the presented memory subsystem in comparison with a selected N-bank and two-level subsystems. The used motion estimation algorithm may be briefly described in Section III(C1), and details of the compared memory subsystems may be provided in Section III(C2). In Section III(C3), the number of memory accesses needed for SIMD implementation of the motion estimation may be analyzed, and thus the maximal processing throughput enabled by each of the compared subsystems. To verify the analytical analysis and conclusions, the experimental results may be provided in Section III(C4).

1) Motion Estimation Algorithm:

Motion estimation may be an important tasks in many video and image applications, such as video frame-rate conversion, video codecs, video and image stabilization and image denoising. To compare the memory subsystems, a 3-D recursive search (3DRS) block-matching algorithm may be used.

The input of this algorithm may be a sequence of luma frames of a video, where each frame may consist of 8 bit data elements (i.e., the luma component of $Y'C_bCr$ pixels representation). These frames may be processed one by one, and for each processed frame (current) one additional frame (reference) may be used. The current frame may be split into blocks of 8*8 elements, and for each block one motion vector may be chosen out of 7 candidate vectors. To choose the best candidate, the currently processed block from the current frame may be compared for similarity to the 7 reference blocks pointed by the candidate vectors in the reference frame. As the measure of similarity of two compared blocks, the sum of their absolute differences (SAD) may be calculated. Since the algorithm uses quarter-pel accurate vectors to increase overall accuracy of motion estimation, the candidate vectors may point between elements of the reference frame. Therefore, elements of the reference blocks used in SAD calculations may be bilinearly interpolated from the elements at neighboring full-pel positions in the reference frame. The summary of the algorithm may be provided in Table II.

2) Compared Memory Subsystems:

An implementation of the described motion estimation algorithm using the two-level memory subsystem may have been reported. The processing throughput per square millimeter of silicon area may be eight times greater than the previous state-of-the-art. Therefore, we may use the two-level subsystem and the reported results in the comparison.

TABLE II

THE BLOCK-MATCHING MOTION ESTIMATION ALGORITHM USED IN THE CASE STUDY. THIS ALGORITHM USES THE SUM OF ABSOLUTE DIFFERENCES (SAD) AS A MEASURE OF SIMILARITY OF TWO 8 * 8 BLOCKS IN THE BLOCK-MATCHING PROCESS. IT EVALUATES 7 CANDIDATE MOTION VECTORS PER BLOCK, BY CALCULATING 7 SAD VALUES BETWEEN THE CURRENTLY PROCESSED BLOCK AND EACH OF THE REFERENCE BLOCKS POINTED BY THE CANDIDATE VECTORS. SINCE THE CANDIDATE VECTORS ARE QUARTER-PEL ACCURATE. THE REFERENCE BLOCKS ARE BILINEARLY INTERPOLATED. IN THIS CASE STUDY THE RESOLUTION OF INPUT VIDEO IS 1920 * 1080 ELEMENTS, AND THE CANDIDATE VECTORS ARE LIMITED WITHIN THE SEARCH AREA OF 224 * 96 ELEMENTS, CENTERED AT THE CURRENTLY PROCESSED BLOCK.

| Block size (elements * lines) | 8 * 8 |
| Blocks similarity measure | SAD |
| Candidate vectors per block | 7 |
| Accuracy of motion vectors | quarter-pel |
| Interpolation of reference blocks | bilinear |
| Video resolution (elements * lines) | 1920 * 1080 |
| Search area size (elements * lines) | 224 * 96 |

To represent the N-bank memory subsystems in the comparison, we choose a $M_R$ subsystem. This memory subsystem may be chosen from among the other N-bank subsystems since this memory subsystem may provide the most suitable access modes for implementation of the motion estimation algorithm, and its internal logic may be the least costly in terms of silicon area.

In case of the memory subsystem, the configuration that enables unaligned access to a 2D block of 9*2 elements may be chosen, which may be suitable for bilinear interpolations of 8*8 reference blocks followed by SAD calculations. Table III may provide details of the compared subsystems.

3) Analysis of Memory Accesses:

The number of memory accesses that need to be performed for one SAD calculation with each of the memory subsystems may be analyzed. To perform an SAD calculation, the current and the reference 8*8 blocks may be needed. The current block may be read from the memory subsystem once per 7 SAD calculations. To read the current block 8*8:N:7=0.6 memory accesses may be performed per SAD calculation. This number may be the same for all three memory subsystems. In case of the two-level subsystem, these accesses may be performed in the second memory level (L1), the one farther from the datapath.

TABLE III

THE DETAILS OF THE MEMORY SUBSYSTEMS COMPARED IN THE MOTION ESTIMATION CASE STUDY. N DENOTES THE NUMBER OF ELEMENTS PROCESSED IN PARALLEL BY THE TARGET SIMD PROCESSOR. $Blk_H$ IS A DESIGN-TIME PARAMETER OF THE SUBSYSTEM PRESENTED IN THIS WORK, AND DENOTES THE MAXIMAL NUMBER OF LINES ACCESSIBLE IN THE SUBSYSTEM IN CASE OF 2D BLOCK ACCESS MODE. $Blk_W$ IS ANOTHER DESIGN-TIME PARAMETER OF THE PRESENTED SUBSYSTEM, AND DENOTES THE MAXIMAL NUMBER OF ELEMENTS PER LINE IN CASE OF A 2D BLOCK ACCESS OF $Blk_H$ LINES. IN THE CASE STUDY, $Blk_W$ IS SET TO $N/Blk_H + 1$ TO ENABLE UNALIGNED ACCESS TO A 9 * 2 2D BLOCK. THEREBY, A BILINEAR INTERPOLATION OF AN 8 * 8 BLOCK CAN BE IMPLEMENTED WITH 5 9 * 2 MEMORY ACCESSES. THAT IS SIGNIFICANTLY FEWER THAN 10 AND 9 ACCESSES NEEDED WITH THE 8 * 2 AND 4 * 4 ACCESS MODES OF THE COMPARED TWO-LEVEL AND N-BANK SUBSYSTEMS. RESPECTIVELY, THE TOTAL CAPACITIES OF THE SUBSYSTEMS ARE GIVEN IN TERMS OF KILOBYTES (KB).

| | This work | Two-level | N-bank |
| --- | --- | --- | --- |
| N (elements) | 16 | 16 | 16 |
| $Blk_H$ (lines) | 4 | — | — |
| $Blk_W$ (elements) | 5 | — | — |
| Access modes | 4 * 4, 8 * 2, | 4 * 4, 8 * 2, | 4 * 4, |
| (elements * lines) | 9 * 2, 16 * 1 | 16 * 1 | 16 * 1 |
| Element width (bits) | 8 | 8 | 8 |
| Total capacity (KB) | 128 | 120 | 128 |

On the other hand, the reference blocks used in SAD calculations may be bilinearly interpolated. For a bilinear interpolation of an 8*8 block, 9*9 neighboring elements may read from the memory subsystem. For the two-level subsystem implementation, 8*2 access mode may have been used, which may imply 10 memory accesses per SAD calculation. These accesses may be performed in the first memory level (L0), which is the closest to the datapath. In case of the N-bank subsystem, 9 4*4 memory accesses may be performed per SAD calculation. In case of the presented memory subsystem and 9*2 access mode, 5 memory accesses may be performed per SAD calculation.

Beside those reads from the on-chip memory subsystem, there may be writes performed to transfer parts of the current and reference frames from the off-chip memory. We may assume the minimal bandwidth to the off-chip memory of one access per element. Therefore, there may be 2*8*8:N:7=1.1 writes per SAD calculation. In an example of the two-level subsystem, these writes may be performed in the L1 memory level.

In the example of the two-level subsystem, additional memory accesses may be performed to transfer the part of the reference frame between the on-chip memory levels (from L1 to L0). The number of reads from the L1 and writes to the L0 memory may depend on the vertical search area in terms of 8*8 blocks, as well as on the order of processing the blocks of a frame. The reported implementation based on the two-level subsystem may have the vertical search area of 96:8=12 blocks, and the block processing order may be a 2-meander. Therefore, there are 8*8*(12+2):N:7:2=4 accesses to both L0 and L1 memories per SAD calculation. The total number of memory accesses per SAD calculation in examples of the presented and the N-bank subsystems is 6.7 and 10.7, respectively. In case of the L0 and the L1 memories of the two-level subsystem, the total number of accesses is 14 and 5.7, respectively. As expected, the higher number of accesses may be performed in the L0 memory. The overall throughput of the two-level subsystem based implementation may therefore be determined by 14 accesses per SAD calculation.

By considering the number of memory accesses per SAD calculation, the presented memory subsystem may enable 1.6 and 2.1 times higher processing throughput than the N-bank and the two-level subsystems, respectively.

4) Experimental Results:

To verify cost-efficient realizability of the concepts presented in Section II, the presented memory subsystem may have been implemented. The subsystem has been implemented as a configurable module in a hardware description language, functionally verified and productized. To get the silicon area of the internal logic and memory banks of the presented memory subsystem, the module configuration specified in Table III may have been synthesized in the low power 65 nm CMOS technology. According to the synthesis results, the internal logic may represent less than 5% of the total silicon area of the subsystem. Compared to the total silicon area of other configurations in FIG. 6, the internal logic may be between 3% for the largest and 13% for the smallest total capacity of the memory subsystem. Therefore, the memory banks costs may be dominant over the logic costs, as assumed in Section III(B).

To measure the processing throughput in terms of frames per second (fps), the motion estimation program for a processor consisting of the presented memory subsystem and an 8-issue Very Long Instruction Word (VLIW) datapath may have been developed. Out of 8 VLIW issue slots, 4 may be with SIMD and 4 may be with scalar functional units. The same datapath may have been previously used for implementation of the motion estimator based on the two-level subsystem. To compile and schedule the developed program, a Silicon Hive ANSI-C compiler may be used. To run the program and measure the processing throughput, the cycle-accurate Silicon Hive Multi-processor simulator may have been used. Based on the memory accesses performed at the program run-time, used access modes and alignment of addresses, power dissipation of the memory subsystem may be calculated in terms of milliwatts (mW). The bandwidth to the off-chip memory in terms of accesses per element of the processed video frames may have been calculated in the same way. The results obtained in this way may be summarized in the column "This work" of Table IV.

For comparison, the column "Two-level" of Table IV may include results of the two-level subsystem based implementation.

The motion estimation program for a processor may be developed based on the N-bank configuration of the presented memory subsystem ($Blk_H=16$ and $Blk_W=1$). The processor datapath may have been the same as used for the implementations with the presented and two-level subsystems. The 4*4 access mode for interpolation of the reference blocks may be used to precisely reflect the most efficient implementation with the compared N-bank subsystem. The processing throughput, power dissipation and off-chip bandwidth may have been obtained in the same way as in the example of the presented memory subsystem. These results may be shown in the column "N-bank" of Table IV.

TABLE IV

THE RESULTS OF THE MOTION ESTIMATION IMPLEMENTATION BASED ON THE MEMORY SUBSYSTEM PRESENTED IN THIS WORK AND A VLIW AND SIMD DATAPATH. FOR COMPARISON, THE RESULTS OF THE IMPLEMENTATIONS BASED ON THE SELECTED REFERENCE TWO-LEVEL AND N-BANK SUBSYSTEMS ARE SHOWN. ALL THREE IMPLEMENTATIONS USE THE SAME MOTION ESTIMATION ALGORITHM AND THE SAME DATAPATH.

TABLE IV-continued

THE FIRST PART SHOWS SILICON AREA COSTS OF THE MEMORY BANKS AND INTERNAL LOGIC IN THE LOW POWER 65 NM CMOS TECHNOLOGY. THE SECOND PART SHOWS THE THROUGHPUT IN TERMS OF THE PROCESSED 1920 * 1080 FRAMES PER SECOND (FPS) ACHIEVED WITH THE CLOCK FREQUENCY OF 250 MHZ, AS WELL AS THE POWER DISSIPATION OF EACH SUBSYSTEM FOR THAT THROUGHPUT. THE BANDWIDTH TO THE OFF-CHIP MEMORY IS GIVEN IN TERMS OF ACCESSES PER ELEMENT OF PROCESSED FRAMES. FINALLY, THE MEASURE OF EFFICIENCY OF EACH SUBSYSTEM IS CALCULATED AS THE PRODUCT OF ALL COSTS (SILICON AREA, POWER DISSIPATION AND OFF-CHIP BANDWIDTH) DIVIDED BY THE ACHIEVED THROUGHPUT. ACCORDING TO THE NORMALIZED VALUES OF THIS MEASURE, THE PRESENTED MEMORY SUBSYSTEM IS 2.6 AND 2.9 TIMES MORE EFFICIENT THAN THE TWO-LEVEL AND N-BANK SUBSYSTEMS, RESPECTIVELY.

| | Processor datapath 8-issue VLIW @ 250 MHz (4 SIMD + 4 scalar issue slots) | | |
|---|---|---|---|
| Memory subsystem | This work | Two-level | N-bank |
| | Silicon area (mm$^2$) | | |
| Memory banks | 0.7563 | 0.7478 | 0.8967 |
| Logic | 0.0365 | 0.0287 | 0.0083 |
| Total | 0.7928 | 0.7765 | 0.9050 |
| Logic/Total | 4.6% | 3.7% | 0.9% |
| Throughput (fps) | 101 | 60 | 71 |
| Dissipation (mW) | 19.33 | 26.49 | 34.54 |
| Off-chip bandwidth (accesses/element) | 1.12 | 1.29 | 1.12 |
| Costs/Throughput | 1 | 2.6 | 2.9 |

As a measure of the memory subsystem efficiency, the product of the costs (i.e., the silicon area, power dissipation and off-chip bandwidth), may be calculated and divided the product by the processing throughput. For each memory subsystem, the calculated value may be normalized by dividing it with the efficiency measure of the presented memory subsystem. The memory subsystem may be more efficient when the value calculated in this way is smaller.

The results of this case study may show that the presented memory subsystem is 2.6 and 2.9 times more efficient than the two-level and N-bank subsystems, respectively. With the presented memory subsystem, 1.7 and 1.4 times higher processing throughput may have achieved. The achieved throughput may be 10-20% less than the maximum enabled by the memory subsystem, determined in Section III(C3). By optimizing the processor datapath for the presented memory subsystem, the maximal processing throughput can be achieved.

The throughput achieved with the presented memory subsystem may be higher by 41 fps compared to the two-level subsystem case. There may be two main differences between these memory subsystems that enable the higher throughput, the number of levels in the on-chip memory hierarchy and the 9*2 access mode. The N-bank subsystem may be in between, since it may have one memory level as the presented subsystem and enable the same access modes as the two-level subsystem. By comparing the throughputs of the N-bank and two-level subsystem examples, it may be determined that having one instead of two on-chip memory levels may increase the throughput by 11 fps. Using the 9*2 access mode in case of the presented subsystem results in the additional 30 fps.

Rather than increasing the number of frames processed per second, the throughput headroom enabled by the presented memory subsystem may be used in other ways. For example, more sophisticated motion estimation with up to 12 candidate vectors per 8*8 block may be performed with the throughput of 60 fps. Another possibility may be to increase the video resolution to approximately 2560*1440 and achieve the 60 fps throughput.

As assumed in Section III(C3), the off-chip bandwidth may be close to the theoretical minimum of one access per element in all compared cases. With the presented and N-bank subsystems, the off-chip bandwidth may be lower by 13% than with the two-level subsystem. The reason for the difference may be a smaller capacity and less efficient use of the on-chip storage space in case of the two-level subsystem, due to two copies of elements of the reference frames in the subsystem.

Section IV: Conclusions

Embodiments may provide a parallel memory subsystem for SIMD processors targeting video and image processing applications. The memory subsystem may enable on-chip storage of 2D arrays of video and image data elements, and unaligned accesses to 1D rows and 2D blocks of elements.

The memory subsystem may be configurable at design-time and at run-time. The design-time parameters may determine parallelism of the subsystem and its flexibility in terms of supported dimensions of 2D block access. At run-time, one of the supported dimensions may be chosen and used for accessing the 2D array. Concurrently with the chosen 2D block, the memory subsystem may enable 1D row accesses in the same array, which may be commonly required for efficient data transfers between the off-chip memory and the on-chip memory.

Silicon area and power dissipation costs of the memory subsystem may be proportional to its parallelism and flexibility. This may provide a full spectrum of trade-off possibilities according to specifics of target applications. Compared to the selected reference subsystems, configurations of the presented memory subsystem may enable 13-25% higher parallelism with lower or similar costs. The configurations that enable higher parallelism advantage (e.g. 50%) may be more power-costly than the reference memory subsystems, but the power overhead may be more than 2 times lower than the parallelism advantage.

Advantages of the presented memory subsystem may have been analytically and experimentally illustrated through implementation of a block-matching motion estimation algorithm. The motion estimator based on the presented memory subsystem may process 40-70% more frames per second and the memory subsystem may dissipate 27-44% less power. The silicon area of the presented memory subsystem may be similar to the smallest area of the reference subsystems. The bandwidth towards the off-chip memory may be equal to the smallest bandwidth of the reference subsystems (i.e., 1.12 accesses per element of processed frames). Considering the number of frames processed per second divided by the product of the three implementation costs, the presented memory subsystem may be 2.6-2.9 times more efficient than the reference subsystems.

Higher efficiency of the memory subsystem may be achieved due to better tailored access modes to the application needs, which may reduce the number of accesses per processed frame by 1.6-2.1 times. The same approach may be used to accelerate other video and image applications with specific memory access needs.

Section V: Further Embodiment

Embodiments may provide an approach to enable fast vector lookup access to a vector scratchpad memory, which may be needed in modern image and video processing applications. A vector scratchpad memory may relate to SIMD processing. In other words, a vector may correspond to SIMD, and scratchpad memory may correspond to cache memory.

The vector lookup access may enable speeding up applications such as image enhancement, object detection and tracking, and high dynamic range imaging (HDR). The presented vector lookup access mode may be a part of vector memory of a SIMD processor, such as the processor 20 of FIG. 1) of a camera subsystem of a chip.

Section V(A): Problem Statement and Previous Solution

A Look-Up Table (LUT) data structure may be an array of values of a mathematical function, provided for a limited number of arguments values. The LUTs may replace slower run-time computations of function values by faster indexing the array. The function values may be pre-computed (at compile time or at the beginning of the program execution) and stored to the LUT in the memory (such as the memory subsystem 30). A read from the LUT (i.e. a lookup) may be a memory access to the address corresponding to the specified table index. If a memory access is faster than computation of the function value, then the program execution may also be faster. The LUTs may be widely used in signal processing, computer graphics and multimedia application domains To enable implementation of LUT based applications on the SIMD processors, a vector lookup access mode to the LUT may be used. An example of an N-wide SIMD processor, an argument of a vector lookup access may be a vector of N table indices, and a result may be a vector of N LUT values corresponding to the specified indices. A simple and cost-efficient way to implement the vector lookup access may be by performing N successive reads from the scalar data memory that contains the LUT, and reading one LUT value per memory access. Latency of such a vector lookup access may be at least N clock cycles, which may be too slow for some (real-time) applications. To enable vector lookup access in a single clock cycle, a memory architecture may be used that consists of N memory banks, where one LUT value may be stored at one addressable word of a memory bank. The LUT may be replicated N times and each replica may be stored in one memory bank, thus enabling lookup access to N independently addressed LUT values at a time. However, this solution may be costly in terms of silicon area when the number of memory banks is large. Moreover, there may be an overhead in storage space proportional to N, since there are N replicas of each LUT value stored in the memory.

Embodiments may provide an approach to enable vector lookup access by reusing a plurality of memory banks of the presented memory subsystem (or the vector scratchpad memory architecture) disclosed above. Since the memory banks may be completely reused, the vector lookup access may be enabled without additional cost in terms of silicon area of the memory banks. Moreover, embodiments may enable a full spectrum of design-time and run-time trade-offs between the vector lookup access latency (speed) and the storage space overhead.

Section V(B): Solution Approach

The memory subsystem (or the vector scratchpad memory architecture) may contain B memory banks of W addressable words and E elements per addressable word, and may enable element aligned access to 1D vectors and 2D blocks of elements. The values of B, W and E may be determined by the three design-time parameters according to the equations 16.1, 16.2 and 16.3, respectively. The first design-time parameter N may be a number of elements in a vector of the SIMD processor. The second parameter C may be a capacity of the memory in terms of vectors. The third parameter $Blk_{Hmax}$ may be a maximum height (in terms of lines) of an element aligned 2D block of elements that may be accessed in the vector memory. As described above, the parameters N and $Blk_{Hmax}$ are powers of two, while C is an even number.

$$B = \begin{cases} 2*Blk_{Hmax}, & Blk_{Hmax} < N \\ Blk_{Hmax}, & Blk_{Hmax} = N \end{cases} \quad (16.1)$$

$$W = \begin{cases} \frac{C}{2}, & Blk_{Hmax} < N \\ C, & Blk_{Hmax} = N \end{cases} \quad (16.2)$$

$$E = \frac{N}{Blk_{Hmax}} \quad (16.3)$$

Section V(C): Concept of Vector Lookup Access

The B memory banks of the described (vector) memory architecture may be used for storing B replicas of a LUT, as shown in FIG. 8, and thus enable reading B independently addressed LUT values at a time. A vector lookup access may be performed in N/B clock cycles. A LUT value may be stored in all B memory banks, while a word of a memory bank may contain E consecutive LUT values.

FIG. 8A shows a LUT of 16 values of a function $f(x)$ for the argument values $x \in [0, 15]$. FIG. 8B shows the LUT is stored to 8 memory banks of 2 elements (LUT values) per addressable word. This method of storing the LUT in the memory banks may enable accessing 8 LUT values at a time. Hence, a vector lookup access of N=8 LUT values may be performed in N/8 clock cycles. The LUT may occupy 8 addressable words in each memory bank.

The location of a LUT value $f(x)$ in each memory bank may be determined by the word address $word_x$ and the element position $elem_x$ within the word, as follows.

$$word_x = \left\lfloor \frac{x}{E} \right\rfloor \quad (16.4)$$

$$elem_x = x \bmod E$$

If the table index x is located at the position p within the input vector of N table indices, the LUT value $f(x)$ may be read from the memory bank $bank_p$ in the clock cycle $cycle_p$ relative to the beginning of the vector lookup access.

$$bank_p = p \bmod B \quad (16.5)$$

$$cycle_p = \left\lfloor \frac{p}{B} \right\rfloor$$

$$p \in [0, N-1]$$

Having B LUT replicas stored in the memory banks may enable the fastest vector lookup access in an example of the proposed architecture with B memory banks. However, the storage space overhead may also be maximal in this example, since each LUT value may be stored in all memory banks. Hence, up to W*E LUT values may be stored in the memory, which is B times less than the memory capacity in terms of elements.

Section V(D): Enabling the Trade-Off Between Vector Lookup Access Latency and Storage Space Overhead There may be R LUT replicas stored in the memory banks ($R \le B$). With R LUT replicas, B memory banks may be grouped in R groups of B/R memory banks per group, and each LUT replica may be stored in a different group of memory banks.

FIG. 9 shows four LUT replicas (R=4) of 16 values stored in 4 groups of 2 memory banks per group. In this example, 4 LUT values may be accessed at a time. A vector lookup access of N=8 LUT values may be performed in N/R=2 clock cycles. The LUT may occupy 4 addressable words in each memory bank.

The number of LUT replicas may be a divisor of the number of memory banks, which is a power of two according to the equation 16.1. Therefore, R may be chosen according to the following equation.

$$R = 2^j, j \in [0, \log_2(B)] \quad (16.6)$$

In example of R LUT replicas stored in the memory banks, the equations $word_x$, $elem_x$, $bank_{x,p}$ and $cycle_p$ may as follows.

$$word_x = \left\lfloor \frac{x}{E * \frac{B}{R}} \right\rfloor \quad (16.7)$$

$$elem_x = x \bmod E$$

$$bank_{x,p} = \left\lfloor \frac{x \bmod \left(E * \frac{B}{R}\right)}{E} \right\rfloor + (p \bmod R) * \frac{B}{R}$$

$$cycle_p = \left\lfloor \frac{p}{B} \right\rfloor$$

$$p \in [0, N-1]$$

Having R LUT replicas stored in the memory banks may enable reading R LUT values at a time, and thus a vector lookup access may be performed in N/R clock cycles. The maximum size of a LUT that may be stored in the memory is W*E*(B/R) values. Accordingly, the storage space overhead may decrease and the latency vector lookup access may increase, as the number of the LUT replicas is becoming lower. Therefore, by choosing the number of LUT replicas at design-time or run-time, a trade-off may occur between the vector lookup access latency and the storage space overhead. With such a trade-off enabled, the vector memory may be better adjusted to the target application requirements.

Section V(E): Writing a LUT to the Memory

Figure 10:
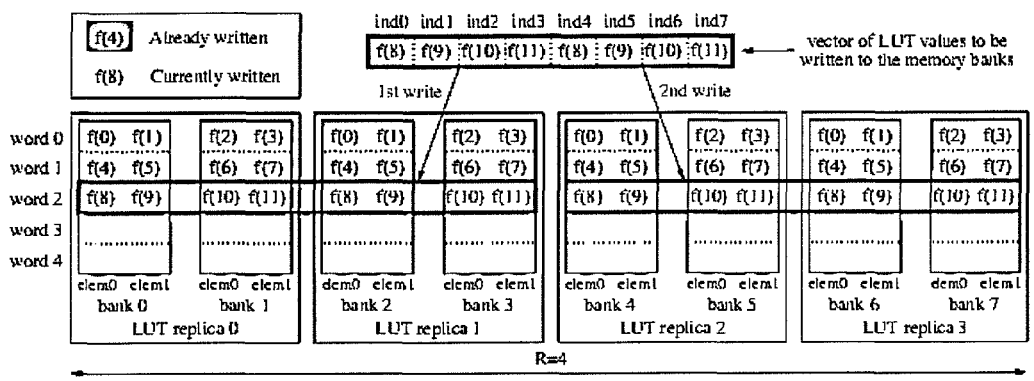
FIG. 10 shows writing a vector of N=8 LUT values to the memory bank.

Writing the LUT to the memory may be performed only once, at the beginning of a program execution. Writing the LUT may not be critical for performance and may be performed by using vector aligned writes of 1D vectors of N elements, as illustrated in FIG. 10 shows writing a vector of N=8 LUT values to the memory banks. In this example, E*(B/R)=4 consecutive LUT values may be replicated N/(E*(B/R))=2 times and copied to the vector. The vector may then be written R/(N/(E*(B/R)))=2 times to the memory banks to write the 4 different LUT values to all R=4 groups of memory banks.

The addressing equations discussed above as well as the addressing circuitry may be reused.

The content of a vector to be written to the LUT in the vector memory may be prepared in the following way. Namely, min(N, E*(B/R)) consecutive LUT values may be replicated max (1, N/(E*(B/R))) times and copied to the vector. The vector may then be written R/max(1, N/(E*(B/R))) times to the memory to write the LUT values to all R groups of the memory banks (LUT replicas).

Section V(F): Application of the Further Embodiment

Embodiments of the vector scratchpad memory and the described vector lookup access mode may be applied in any SIMD processor. It may be suitable in an example of processors designed for low power, cost sensitive and real-time applications in domains of signal processing, computer graphics and multimedia. The proposed vector lookup access mode may be applied in the vector scratchpad memory of a camera subsystem of a chip.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic apparatus comprising: a processor; and
a memory subsystem that includes B parallel memory banks accessible by the processor, B being an integer, wherein the B memory banks are to store B replicas of a look-up table of N elements, each memory bank storing N/B look-up table values, N being an integer divisible by B, wherein the processor is to access the B memory banks to obtain the N elements of the look-up table in N/B number of clock cycles, wherein when N equals 8, a number of clock cycles to be performed by the processor to access the B memory banks equals N/8.

2. The electronic apparatus of claim 1, wherein the N/B equals 2.

3. The electronic apparatus of claim 2, wherein each memory bank to include one look-up table replica.

4. The electronic apparatus of claim 1, wherein the memory subsystem is to be provided in a vector lookup access mode.

5. The electronic apparatus of claim 4, wherein the vector lookup access is to be provided when the memory subsystem is in the vector lookup access mode.

6. The electronic apparatus of claim 1, wherein each memory bank is to include a plurality of addressable words per bank.

7. The electronic apparatus of claim 6, wherein each word is to include N elements for a particular bank.

8. The electronic apparatus of claim 1, wherein the processor is a single instruction-multiple data processor.

9. The electronic apparatus of claim 1, wherein the memory subsystem is provided on-chip with the processor.

10. The electronic apparatus of claim 1, wherein the processor is to perform high dynamic range (HDR) imaging.

11. The electronic apparatus of claim 1, wherein the processor is to perform image enhancement.

12. The electronic apparatus of claim 1, wherein the processor is to perform object detection and tracking.

13. An electronic apparatus comprising: a processor; and
a memory subsystem that includes B parallel memory banks accessible by the processor, to store R replicas of a look-up table of N look-up values, B and R being integers, wherein R is less than or equal to B, wherein B is divisible by R, wherein the B memory banks are grouped in R groups of B/R memory banks per group, wherein each replica is stored in a different group of memory banks, wherein the processor is to access the R groups of the memory bank to obtain the N look-up values of the look-up table in N/R number of clock cycles, wherein when N equals 8 and R equals 4, a number of clock cycles to be performed by the processor to obtain the N look-up values equals 2.

14. The electronic apparatus of claim 13, wherein the N*R/B look-up values are to be stored in a parallel memory bank.

15. The electronic apparatus of claim 13, wherein the memory subsystem is to be provided in a vector lookup access mode.

16. The electronic apparatus of claim 15, wherein a vector lookup access is to be provided when the memory subsystem is in the vector lookup access mode.

17. The electronic apparatus of claim 13, wherein each memory bank is to include a plurality of addressable words per bank.

18. The electronic apparatus of claim 17, wherein each word is to include a plurality of elements for a particular bank.

19. The electronic apparatus of claim 13, wherein the processor is a single instruction-multiple data processor.

20. The electronic apparatus of claim 13, wherein the memory subsystem is provided on-chip with the processor.

* * * * *